US009954595B2

(12) United States Patent
Sanderovich

(10) Patent No.: US 9,954,595 B2
(45) Date of Patent: Apr. 24, 2018

(54) FRAME FORMAT FOR LOW LATENCY CHANNEL BONDING

(71) Applicant: QUALCOMM Incorporated, San Diego, CA (US)

(72) Inventor: Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 14/946,979

(22) Filed: Nov. 20, 2015

(65) Prior Publication Data

US 2016/0149631 A1  May 26, 2016

Related U.S. Application Data

(60) Provisional application No. 62/084,218, filed on Nov. 25, 2014.

(51) Int. Cl.
| | |
|---|---|
| *H04B 7/06* | (2006.01) |
| *H04L 27/26* | (2006.01) |
| *H04B 7/0452* | (2017.01) |
| *H04L 5/00* | (2006.01) |

(52) U.S. Cl.
CPC ......... *H04B 7/0684* (2013.01); *H04B 7/0452* (2013.01); *H04L 5/001* (2013.01); *H04L 5/0053* (2013.01); *H04L 5/0064* (2013.01); *H04L 27/2613* (2013.01); *H04L 27/2695* (2013.01)

(58) Field of Classification Search
CPC ..... H04L 5/001; H04L 5/0053; H04L 5/0064; H04L 27/2613; H04L 27/2695; H04B 7/0452; H04B 7/0684
See application file for complete search history.

(56) References Cited

U.S. PATENT DOCUMENTS

| | | | | |
|---|---|---|---|---|
| 5,428,610 | A * | 6/1995 | Davis | H04H 20/28 370/312 |
| 2005/0180524 | A1* | 8/2005 | Hansen | H04L 1/0001 375/295 |
| 2005/0181800 | A1* | 8/2005 | Trachewsky | H04L 5/1438 455/452.1 |
| 2005/0233709 | A1* | 10/2005 | Gardner | H04W 99/00 455/101 |
| 2010/0061402 | A1* | 3/2010 | van Zelst | H04L 5/0023 370/474 |

(Continued)

FOREIGN PATENT DOCUMENTS

WO    2005018180 A1    2/2005

OTHER PUBLICATIONS

International Search Report and Written Opinion—PCT/US2015/062032—ISA/EPO—dated Apr. 12, 2016.

(Continued)

*Primary Examiner* — Asad Nawaz
*Assistant Examiner* — Saad A Waqas
(74) *Attorney, Agent, or Firm* — Patterson & Sheridan, LLP

(57) ABSTRACT

Certain aspects of the present disclosure provide methods and apparatus for reducing latency in systems including legacy devices by transmitting legacy-decodable preamble information in each of multiple channels and for transmitting preamble information for channel estimation of a multi-channel transmission in gaps between the multiple channels.

26 Claims, 7 Drawing Sheets

(56) References Cited

U.S. PATENT DOCUMENTS

2013/0108271 A1* 5/2013 Tang ............... H04L 7/0008
398/66
2015/0249531 A1* 9/2015 Lindoff ............ H04L 1/1812
370/280

OTHER PUBLICATIONS

Lanante L, et al., "IEEE802.11ac Preamble with Legacy 802.11a/n Backward Compatibility", IEEE 802.11-YY/0847R0, [Online] Jul. 14, 2009 (Jul. 14, 2009), pp. 1-18, XP002606794, Retrieved from the Internet: URL:http://www.google.de/url"sa=t&source=web&cd=3&ved=0CBgQFjAC&url=https%3A%2F%2Fmentor.ieee.org%2F802.11%2Fdcn%2F10%2F11-10-0791-02-00ac-pha se-rotation-for-the-80-mhz-802-11ac-mixed-mode-packet.ppt&ei=u3bFT07TE8qh4QbZko26Aw&usg=AFQjCNHYliVI8HNns-ZmesHd33saVGqWpOw> [retrieved on Oct. 25, 2010].

Jyanik G.S., et al., "Optimal Guard-band-aware Channel Assignment with and Aggregation in Multi-Channel Systems", 2013 IEEE GLOBECOM Workshops, Wireless Networking Symposium, (GCWKSHPS), XP032619486, Dec. 9, 2013, pp. 4769-4774, DOI: 10.1109/GLOCOMW.2013.6855705 [retrieved on Jul. 14, 2014].

* cited by examiner

FRAME FORMAT FOR LOW LATENCY CHANNEL BONDING

CROSS-REFERENCE TO RELATED APPLICATION(S)

This application claims the benefit of U.S. Provisional Application Ser. No. 62/084,218, entitled, "FRAME FORMAT FOR LOW LATENCY CHANNEL BONDING," filed Nov. 25, 2014, assigned to the assignee hereof and hereby expressly incorporated by reference herein.

FIELD

Certain aspects of the present disclosure generally relate to wireless communications and, more particularly, to techniques for reducing latency when communication using multiple transmission channels.

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for wireless communications. The apparatus generally includes a processing system configured to generate a frame for transmission on a plurality of channels, the frame having first information comprising at least one of preamble, channel estimation, or header information decodable and for processing by first and second types of devices, and wherein the first information is repeated in each of the plurality of channels during transmission of the frame, second information comprising at least one of preamble, channel estimation, or header information decodable and for processing by the second type of device, and wherein the second information occupies gaps between the channels during transmission of the frame, and a portion spanning the plurality of channels and the gaps; and an interface for outputting the frame for transmission.

Certain aspects of the present disclosure provide an apparatus for wireless communications. The apparatus generally includes an interface for obtaining a frame having first information comprising at least one of preamble, channel estimation, or header information decodable and for processing by first and second types of wireless devices, the first information is repeated in each of the plurality of channels, second information comprising at least one of preamble, channel estimation, or header information decodable and for processing by the second type of device, and wherein the second information occupies gaps between the channels, and a portion spanning the plurality of channels and the gaps; and a processing system configured to process the first information and generate a channel estimate based, at least in part, on the second information, and to decode at least some of the portion of the frame based on the channel estimate.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
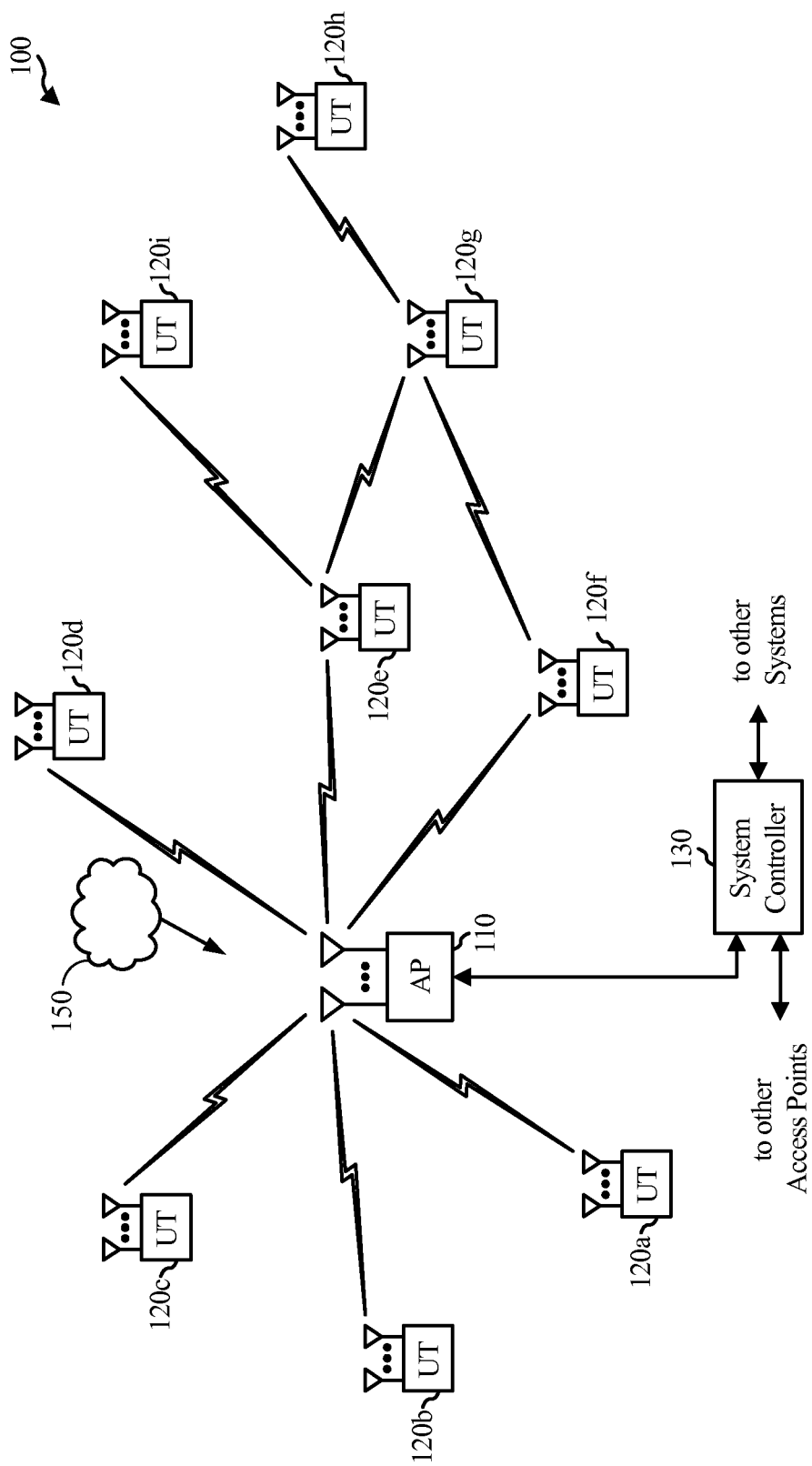
FIG. 1 is a diagram of an example wireless communications network, in accordance with certain aspects of the present disclosure.

Aspects of the present disclosure provide techniques for reducing latency in systems including legacy devices by transmitting legacy-decodable preamble information in each of multiple channels and for transmitting preamble information for channel estimation of a multi-channel transmission in gaps between the multiple channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
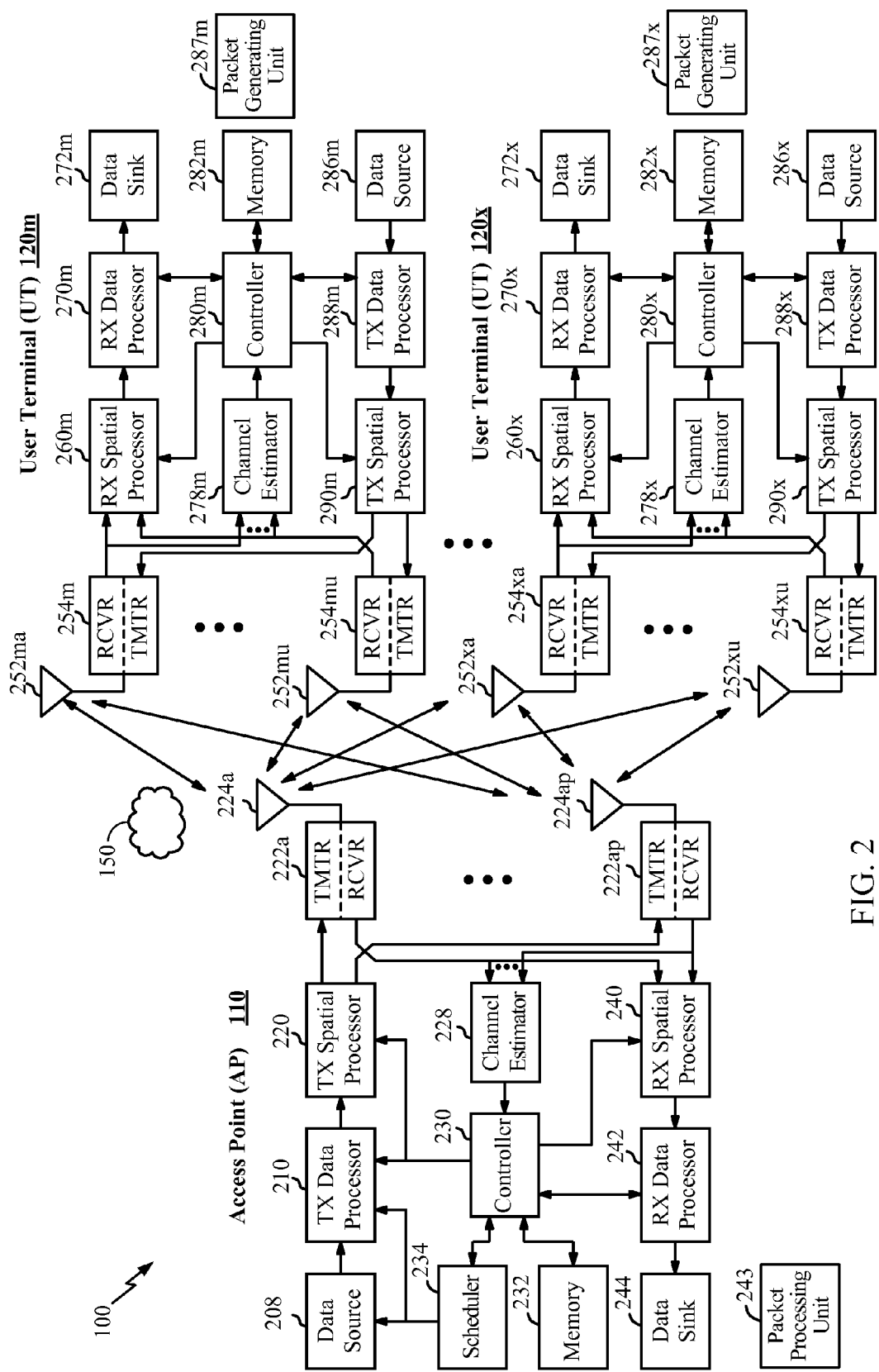
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
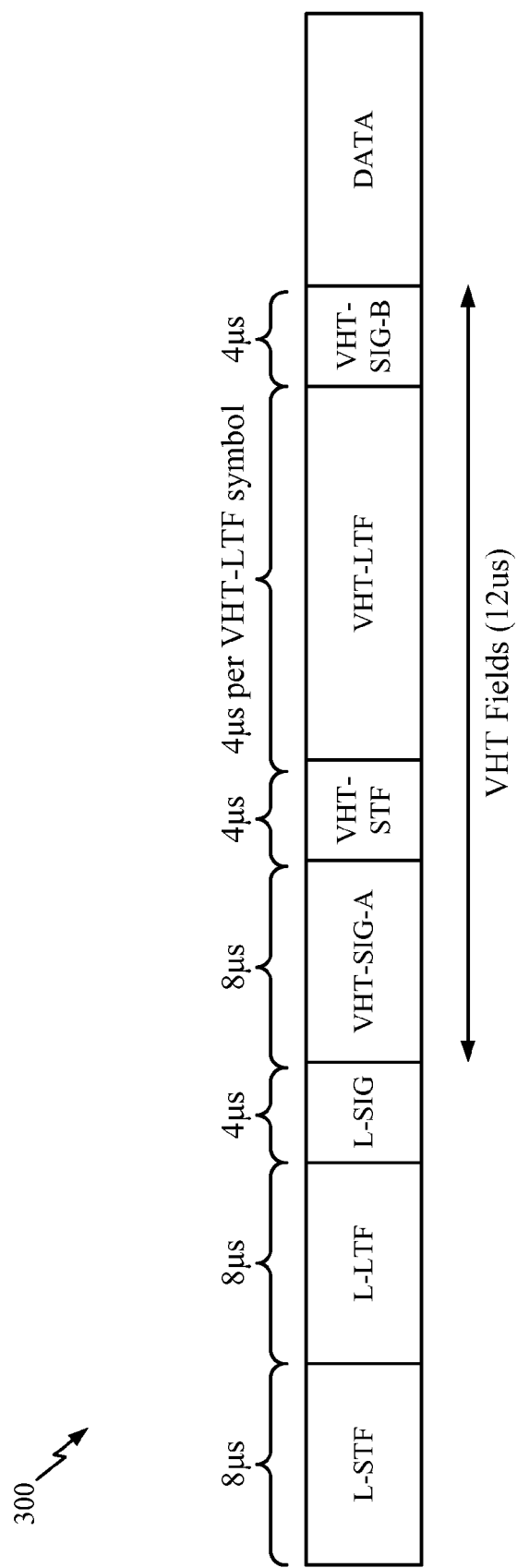
FIG. 3 illustrates an example mixed mode preamble format.
Figure 4:
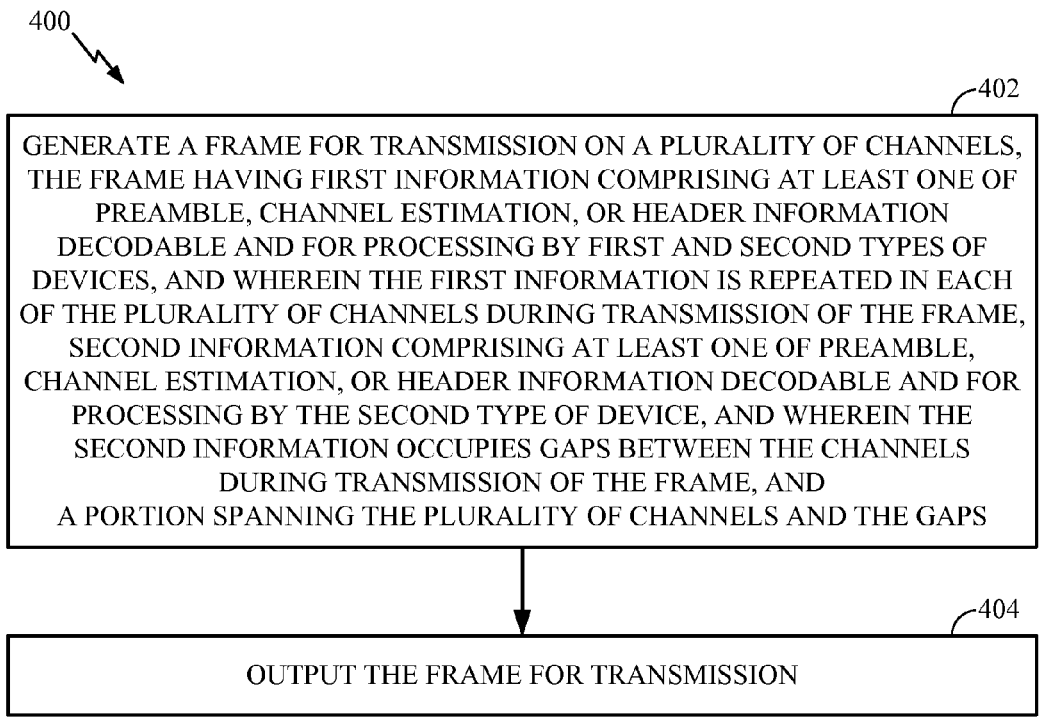
FIG. 4 is a flow diagram of example operations for generating a packet with preamble information transmitted in channel gaps, in accordance with certain aspects of the present disclosure.

As illustrated, in FIGS. 1 and 2, one or more user terminals 120 may send one or more High Efficiency WLAN (HEW) packets 150, with a preamble format as described herein (e.g., in accordance with one of the example formats shown in FIGS. 3A-4), to the access point 110 as part of a UL MU-MIMO transmission, for example. Each HEW packet 150 may be transmitted on a set of one or more spatial streams (e.g., up to 4). For certain aspects, the preamble portion of the HEW packet 150 may include tone-interleaved LTFs, subband-based LTFs, or hybrid LTFs (e.g., in accordance with one of the example implementations illustrated in FIGS. 10-13, 15, and 16).

The HEW packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the HEW packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a HEW packet 150 based on the IEEE 802.11 HEW standard, but may interpret a legacy packet (e.g., a packet complying with IEEE 802.11a/b/g) in a different manner, according to the standards amendment associated therewith.

Example Frame Format for Low Latency Channel Bonding

Aspects of the present disclosure provide techniques for reducing latency in systems devices by transmitting legacy-decodable preamble information in each of multiple channels and for transmitting preamble information for channel estimation of a multi-channel transmission in gaps between the multiple channels.

The techniques may be used, for example, when transmitting in multiple channels (e.g., double/triple/quadraple 802.11 bands), in systems with legacy devices (capable of only communicating in a single band) need to be informed about the multi-channel transmitted packet, so they can update their respective network allocation vector (NAV) settings. The techniques may even allow devices working in single a single band to update their NAV settings.

One approach (e.g., for 802.11n and 802.11ac and 802.11ax STAs), is to send preamble information (e.g., the preambles/CES/data that are sent prior to the multi-channel data), in all single channels overlapping the multi-channel. Since several estimations may be required (to perform accurate channel estimation across the combined channel) to enable double channel operation, the STAs may send additional information (preamble\CES \Header) using the combined (e.g., double) channel. This additional information may be transmitted in fields referred to as high throughput short training fields (HT-STFs), very high throughput short training fields (VHT-STFs), HT long training fields (HT-LTFs), and VHT long training fields (VHT-LTFs) in 802.11n and 802.11ac.

An example of such a format is shown in FIG. 3. While this format allows stations to achieve double channel estimations (via the HT/VHT fields) and single channel protection (via the legacy portion), it also significantly increases latency.

Aspects of the present disclosure, however, provide techniques that may help expand bandwidth (e.g., for doubling the channel) on wireless transmissions (e.g., for advanced or future generations of standard, such as 802.11ad, or other standards), by sending additional preambles and channel estimation for the multi-channel in gaps between combined channels. These combined channels are sometime referred to as "bonded" channels as they are effectively bonded to form a single larger channel. As noted above, the approach presented herein may still enable a (so-called "legacy") single band receiver to be able to receive without any significant degradation (since header sensitivity may be very low, for example, approximately −5 dB) while allowing multiple channel stations to use (substantially) the same time interval for all multi-channel estimations. Thus, the techniques presented herein may help avoid at least some of the additional latency described above with reference to FIG. 3.

FIG. 4 is a flow diagram of example operations 400 for generating frames, in accordance with certain aspects of the present disclosure, with information provided in gaps between multiple "bonded" channels. The operations 400 may be performed by an apparatus, such as an AP (e.g., access point 110).

The example operations 400 begin, at 402, by generating a frame for transmission on a plurality of channels, the frame having first information comprising at least one of preamble, channel estimation, or header information decodable and for processing by first and second types of devices, and wherein the first information is repeated in each of the plurality of channels during transmission of the frame, second information comprising at least one of preamble, channel estimation, or header information decodable and for processing by the second type of device, and wherein the second information occupies gaps between the channels during transmission of the frame, and a portion spanning the plurality of channels and the gaps. At 404, the frame is output for transmission.

Figure 5:
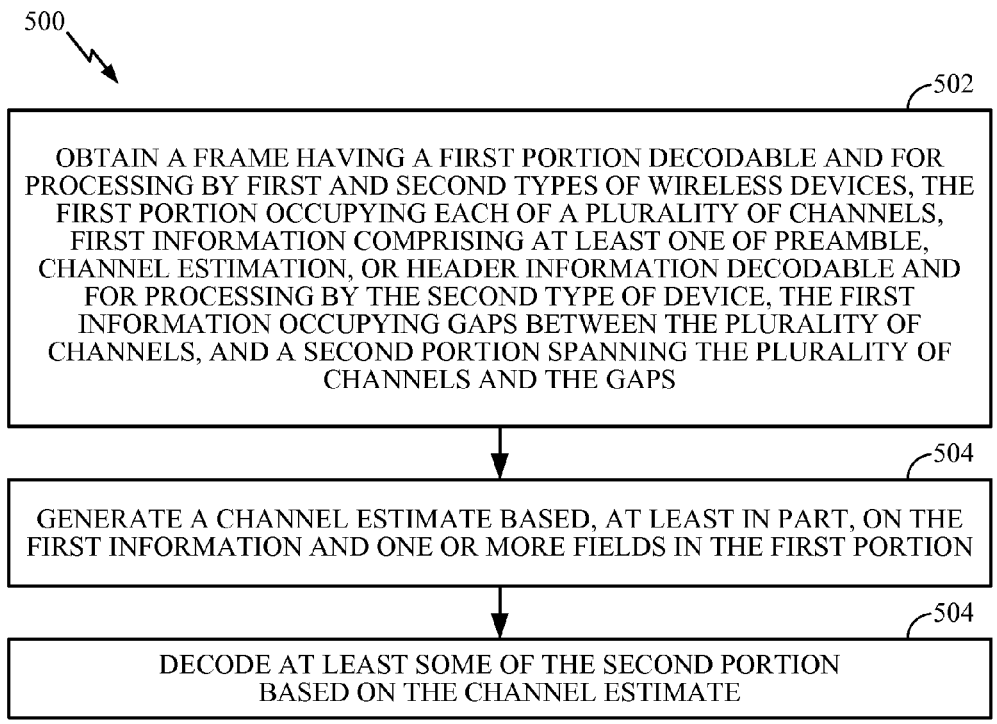
FIG. 5 is a flow diagram of example operations for processing a packet with preamble information transmitted in channel gaps, in accordance with certain aspects of the present disclosure.

FIG. 5 is a flow diagram of example operations 500 for processing one or more packets, in accordance with certain aspects of the present disclosure. The operations 500 may be performed by an apparatus, such as an STA (e.g., user terminal 120), and may be considered complementary to operations 400 of FIG. 4. In other words, operations 500 may be performed by a STA processing a frame generated and transmitted by an AP in accordance with operations 400 of FIG. 4.

The operations 500 begin, at 502, by obtaining a frame having a first portion decodable and for processing by first and second types of wireless devices, the first portion occupying each of a plurality of channels, first information comprising at least one of preamble, channel estimation, or header information decodable and for processing by the second type of device, the first information occupying gaps between the plurality of channels, and a second portion spanning the plurality of channels and the gaps.

At 504, the station generates a channel estimate based, at least in part, on the first information and one or more fields in the first portion. At 506, the station decodes at least some of the second portion of the frame (spanning the plurality of channels and the gaps) based on the channel estimate.

Figure 6:
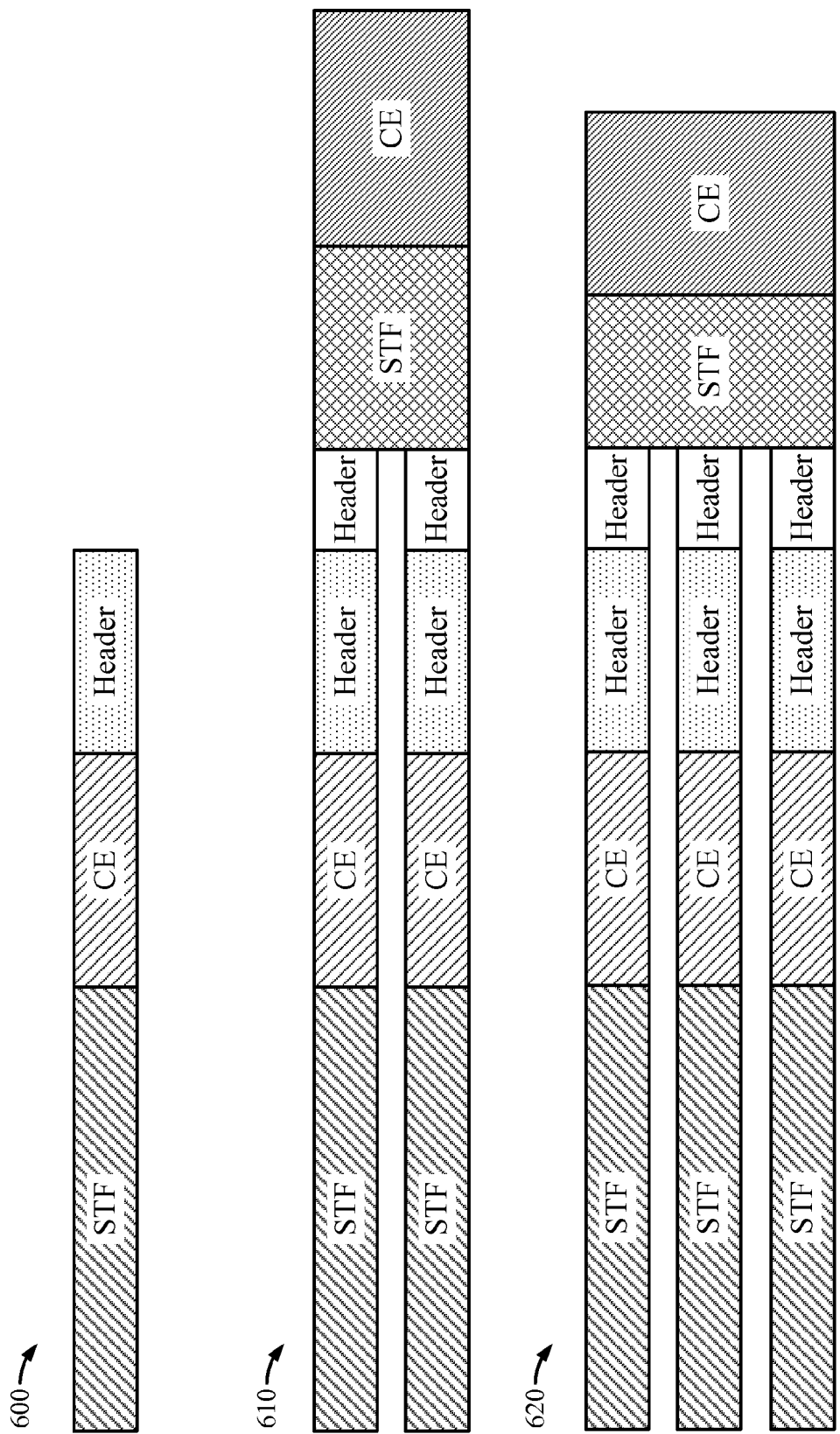
FIGS. 6 and 7 illustrate example frame formats, in accordance with certain aspects of the present disclosure.

FIG. 6 illustrates an example legacy frame format 600 that may be repeated across multiple channels (e.g., designated for communicating with legacy devices). For example, as shown at 610 and 620, the legacy format may be repeated across double or triple channels (which may be at least two contiguous channels, such as, second or third channels). This legacy portion may correspond to the first portion described above with reference to operations 500 of FIG. 5. As illustrated in FIG. 6, this first portion may include short training fields (STFs), a channel estimation (CE) field, and a header (e.g., with information regarding MCS and indicating a type of the frame).

As illustrated, in either case, additional header and preamble information may be sent after the legacy preamble, to allow for channel estimation of subsequent multi-channel data (not shown).

Figure 7:
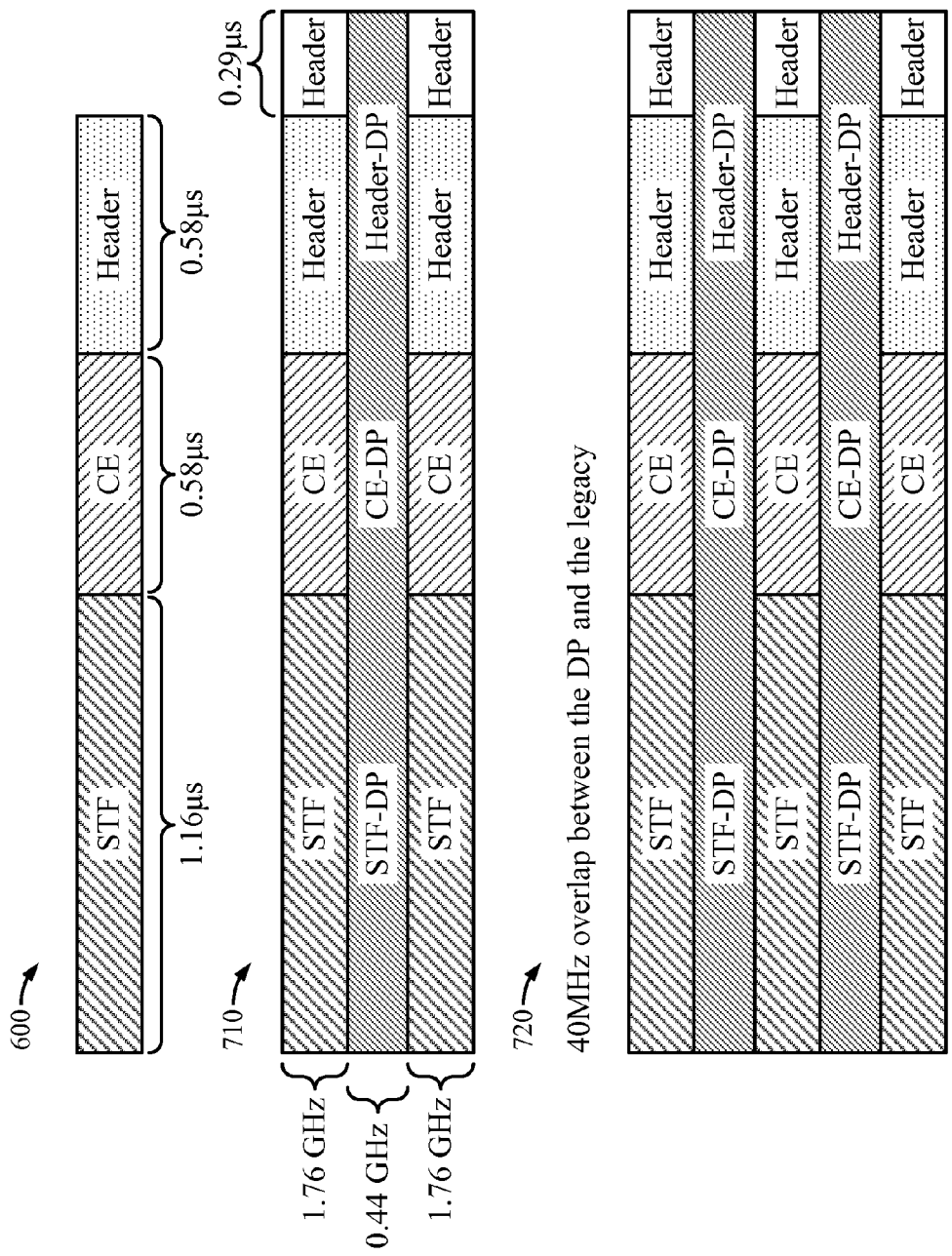

As illustrated in FIG. 7, however, rather than include this additional information after the legacy preambles, the additional information may be included earlier using gaps between the multiple channels. For example, as shown at 710 and 720, the additional information may be included in a single gap between double channels or in two gaps between triple channels. In general, for a transmission on n channels, additional information could be transmitted in n–1 gaps.

As illustrated, assuming 1.76 GHz width channels, the additional information may be transmitted in a 0.44 GHz gap (e.g., approximately ¼ the size of each of the channels). As illustrated, the additional information may include a short training field (STF) and/or a channel estimation (CE) field. As shown, the frame may also include subsequent header information, decodable by the second type of device, occupying the same channels as the first preamble information. Of course, these channel and gap sizes are examples only and actual gap sizes may change accordingly with different channel sizes.

As illustrated, the remaining portion (spanning the individual channels and gaps) may comprise at least one of a short training field (STF) spanning the plurality of channels and a field with information for channel estimation (CE) spanning the plurality of channels.

As noted above, the remaining portion may include a data portion spanning the bonded channels. In such case, a receiving station may decode the data portion of the remaining portion of the frame, based, at least in part, on the STF and CE fields spanning the plurality of channels.

The techniques presented herein may help reduce latency by providing information used to decode a later portion of a frame earlier in the frame, for example, in gaps between bonded channels. As a result, overall frame length may be reduced, freeing up bandwidth for other devices and, thereby, improving overall system performance (by using the information provided in the gaps for decoding later portions of a frame).

Figure 4A:
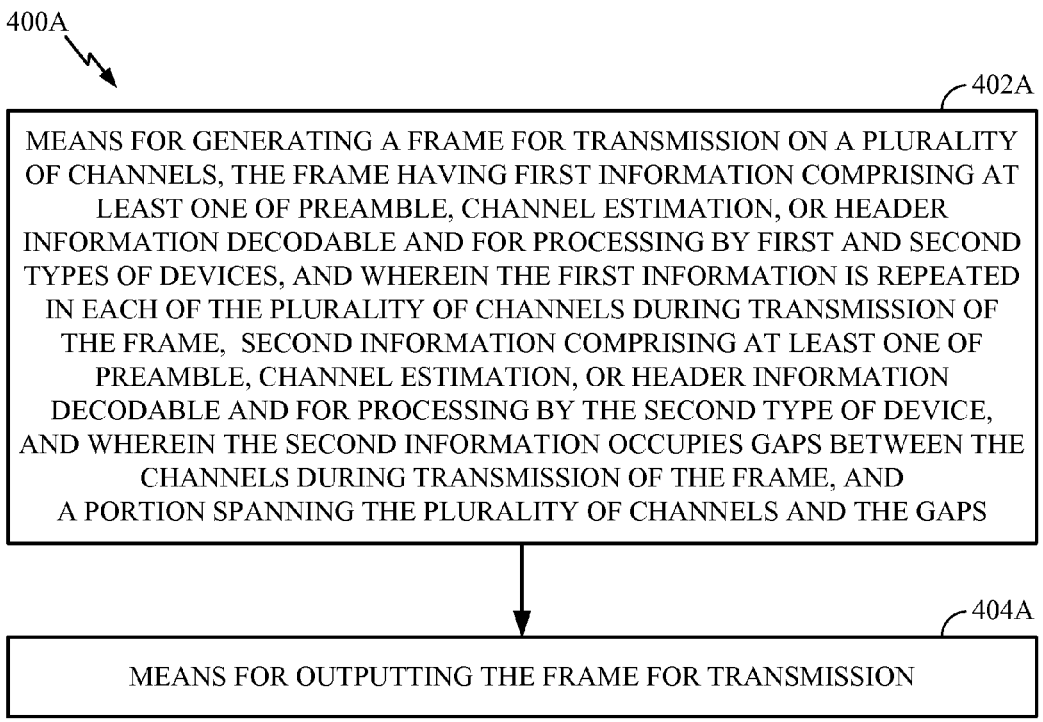
FIG. 4A illustrates example means capable of performing the operations shown in FIG. 4.
Figure 5A:
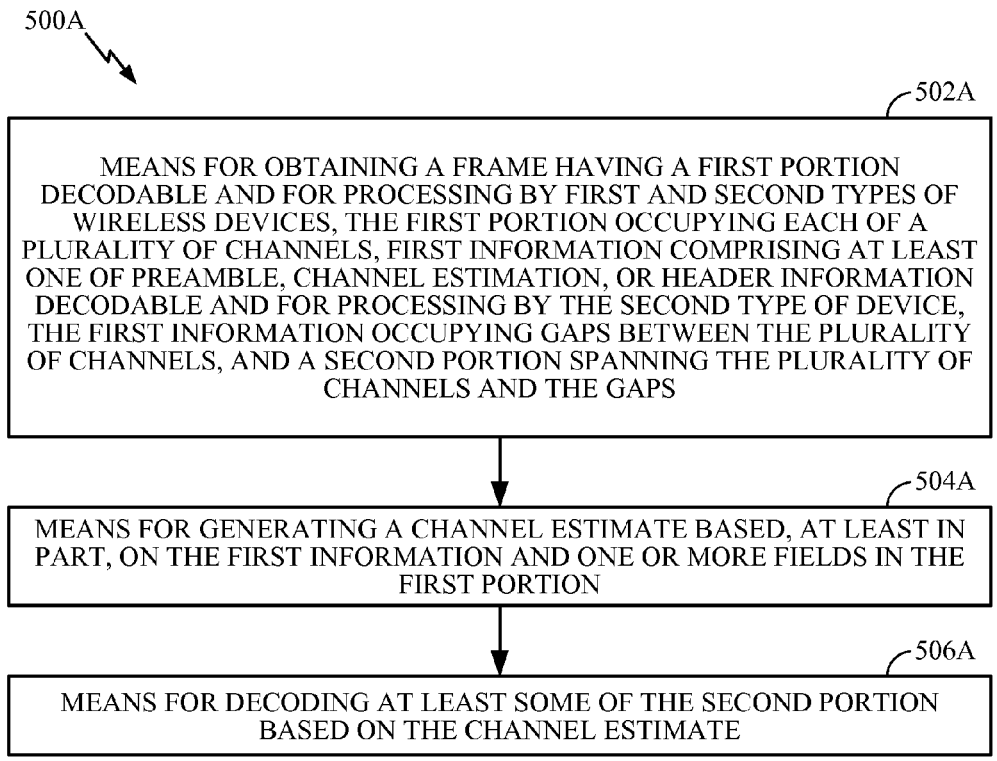
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 and 500 illustrated in FIGS. 4 and 5 correspond to means 400A and 500A illustrated in FIGS. 4A and 5A.

For example, means for transmitting may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for generating, means for performing frequency offset adjustment, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a frame for transmission on a plurality of channels, the frame having:
    first information comprising at least one of preamble, channel estimation, or header information decodable and for processing by first and second types of devices, and wherein the first information is repeated in each of the plurality of channels during transmission of the frame,
    second information comprising a short training field (STF) and a field with information for channel estimation (CE) decodable and for processing by the second type of device, and wherein the second information occupies gaps between the plurality of channels during transmission of the frame, wherein each of the gaps is approximately one fourth of a width of each of the channels, and wherein for n channels the second information occupies n−1 gaps, wherein n is an integer greater than one, and
    a portion spanning the plurality of channels and the gaps; and
    an interface for outputting the frame for transmission.

2. The apparatus of claim 1, wherein the plurality of channels comprises at least two contiguous channels.

3. The apparatus of claim 1, wherein the plurality of channels comprise channels designated for communicating with the first type of device.

4. The apparatus of claim 1, wherein the frame further comprises third information, decodable by the first and second types of devices, occupying the same channels as the first information.

5. The apparatus of claim 1, wherein the portion comprises at least one of a short training field (STF) spanning the plurality of channels and the gaps or a field with information for channel estimation (CE) spanning the plurality of channels and the gaps.

6. The apparatus of claim 1, further comprising a transmitter for transmitting the frame, wherein the apparatus is configured as an access point.

7. An apparatus for wireless communications, comprising:
    an interface for obtaining a frame having:
    a first portion decodable and for processing by first and second types of wireless devices, the first portion occupying each of a plurality of channels,
    first information comprising a short training field (STF) and a field with information for channel estimation (CE) decodable and for processing by the second type of device, the first information occupying gaps between the plurality of channels, wherein each of the gaps is approximately one fourth of a width of each of the channels, and wherein for n channels the first information occupies n−1 gaps, wherein n is an integer greater than one, and
    a second portion spanning the plurality of channels and the gaps; and
    a processing system configured to generate a channel estimate based, at least in part, on the first information and one or more fields in the first portion, and to decode at least some of the second portion based on the channel estimate.

8. The apparatus of claim 7, wherein the one or more fields of the first portion comprise at least one of a short training field (STF) or a header field.

9. The apparatus of claim 7, wherein the plurality of channels comprises at least two contiguous channels.

10. The apparatus of claim 7, wherein the plurality of channels comprise channels designated for communicating with the first type of device.

11. The apparatus of claim 7, wherein:
    the frame further comprises second information, decodable by the first and second types of devices, occupying the same channels as the first portion; and
    the processing system is configured to decode data included in the second portion, based on the second information.

12. The apparatus of claim 7, wherein:
    the second portion comprises at least one of a short training field (STF) spanning the plurality of channels and the gaps or a field with information for channel estimation (CE) spanning the plurality of channels and the gaps; and
    the processing system is configured to decode data included in the second portion, based on the at least one of the STF or the field with information for CE.

13. The apparatus of claim 7, further comprising a receiver for receiving the frame, wherein the apparatus is configured as a user terminal.

14. A method for wireless communications by an apparatus, comprising:
   generating a frame for transmission on a plurality of channels, the frame having:
   first information comprising at least one of preamble, channel estimation, or header information decodable and for processing by first and second types of devices, and wherein the first information is repeated in each of the plurality of channels during transmission of the frame,
   second information comprising a short training field (STF) and a field with information for channel estimation (CE) decodable and for processing by the second type of device, and wherein the second information occupies gaps between the plurality of channels during transmission of the frame, wherein each of the gaps is approximately one fourth of a width of each of the channels, and wherein for n channels the second information occupies n−1 gaps, wherein n is an integer greater than one, and
   a portion spanning the plurality of channels and the gaps; and
   outputting the frame for transmission.

15. The method of claim 14, wherein the plurality of channels comprises at least two contiguous channels.

16. The method of claim 14, wherein the plurality of channels comprise channels designated for communicating with the first type of device.

17. The method of claim 14, wherein the second information further comprises header information.

18. The method of claim 14, wherein the frame further comprises third information, decodable by the first and second types of devices, occupying the same channels as the first information.

19. The method of claim 14, wherein the portion comprises at least one of a short training field (STF) spanning the plurality of channels and the gaps or a field with information for channel estimation (CE) spanning the plurality of channels and the gaps.

20. A method for wireless communications by an apparatus, comprising:
   obtaining a frame having:
   a first portion decodable and for processing by first and second types of wireless devices, the first portion occupying each of a plurality of channels,
   first information comprising a short training field (STF) and a field with information for channel estimation (CE) decodable and for processing by the second type of device, the first information occupying gaps between the plurality of channels, wherein each of the gaps is approximately one fourth of a width of each of the channels, and wherein for n channels the first information occupies n−1 gaps, wherein n is an integer greater than one, and
   a second portion spanning the plurality of channels and the gaps;
   generating a channel estimate based, at least in part, on the first information and one or more fields in the first portion; and
   decoding at least some of the second portion based on the channel estimate.

21. The method of claim 20, wherein the one or more fields of the first portion comprise at least one of a short training field (STF) or a header field.

22. The method of claim 20, wherein the plurality of channels comprises at least two contiguous channels.

23. The method of claim 20, wherein the plurality of channels comprise channels designated for communicating with the first type of device.

24. The method of claim 20, wherein the first information comprises header information.

25. The method of claim 20, wherein:
   the frame further comprises second information, decodable by the first and second types of devices, occupying the same channels as the first portion; and
   the method comprises decoding data included in the portion, based on the second information.

26. The method of claim 20, wherein:
   the second portion comprises at least one of a short training field (STF) spanning the plurality of channels and the gaps or a field with information for channel estimation (CE) spanning the plurality of channels and the gaps; and
   the method comprises decoding data included in the second portion, based on the at least one of the STF or the field with information for CE.

* * * * *